(12) United States Patent
Uro

(10) Patent No.: US 8,189,908 B2
(45) Date of Patent: May 29, 2012

(54) SYSTEM AND METHOD FOR COMPRESSING VIDEO DATA AND ALPHA CHANNEL DATA USING A SINGLE STREAM

(75) Inventor: Tinic Uro, San Francisco, CA (US)

(73) Assignee: Adobe Systems, Inc., San Jose, CA (US)

( * ) Notice: Subject to any disclaimer, the term of this patent is extended or adjusted under 35 U.S.C. 154(b) by 1744 days.

(21) Appl. No.: 11/219,232

(22) Filed: Sep. 2, 2005

(65) Prior Publication Data

US 2007/0053424 A1 Mar. 8, 2007

(51) Int. Cl.
*G06K 9/36* (2006.01)
(52) U.S. Cl. .......................... 382/166; 382/234; 345/592
(58) Field of Classification Search .................. 382/232, 382/166, 234; 375/240; 345/592, 605
See application file for complete search history.

(56) References Cited

U.S. PATENT DOCUMENTS

| 5,227,863 | A | * | 7/1993 | Bilbrey et al. ................. 348/578 |
| 5,831,604 | A | | 11/1998 | Gerber |
| 5,897,413 | A | | 4/1999 | Erland |
| 6,023,302 | A | * | 2/2000 | MacInnis et al. .............. 348/597 |
| 6,614,444 | B1 | | 9/2003 | Duluk et al. |
| 6,741,261 | B2 | | 5/2004 | Chen |
| 6,870,538 | B2 | * | 3/2005 | MacInnis et al. .............. 345/505 |
| 6,954,215 | B2 | * | 10/2005 | Noyle ........................... 345/592 |
| 6,959,110 | B1 | | 10/2005 | Danskin et al. |
| 7,307,667 | B1 | * | 12/2007 | Yeh et al. ....................... 348/555 |
| 7,414,632 | B1 | * | 8/2008 | Piazza et al. ................... 345/592 |
| 7,450,134 | B2 | | 11/2008 | Maynard et al. |
| 7,486,337 | B2 | | 2/2009 | Bian |
| 8,014,615 | B2 | | 9/2011 | Uro et al. |
| 2005/0196062 | A1 | * | 9/2005 | Cho et al. ....................... 382/240 |
| 2006/0033747 | A1 | | 2/2006 | Chen et al. |
| 2006/0050787 | A1 | * | 3/2006 | Winger .................... 375/240.12 |

OTHER PUBLICATIONS

Notice of Allowance and Fee(s) due dated Apr. 15, 2011, for U.S. Appl. No. 11/219,230.
Office Action dated Jun. 23, 2010 for U.S. Appl. No. 11/219,230.
Response filed Sep. 23, 2010 for U.S. Appl. No. 11/219,230.
Notice of Allowance and Fee(s) Due for U.S. Appl. No. 11/219,230.

* cited by examiner

*Primary Examiner* — Matthew Bella
*Assistant Examiner* — Dennis Rosario
(74) *Attorney, Agent, or Firm* — Fish & Richardson P.C.

(57) ABSTRACT

A system and method provides video data and its corresponding alpha channel data using a single stream or file, compressed using the same format and decompression algorithm for each of the video data and the alpha channel data.

14 Claims, 5 Drawing Sheets

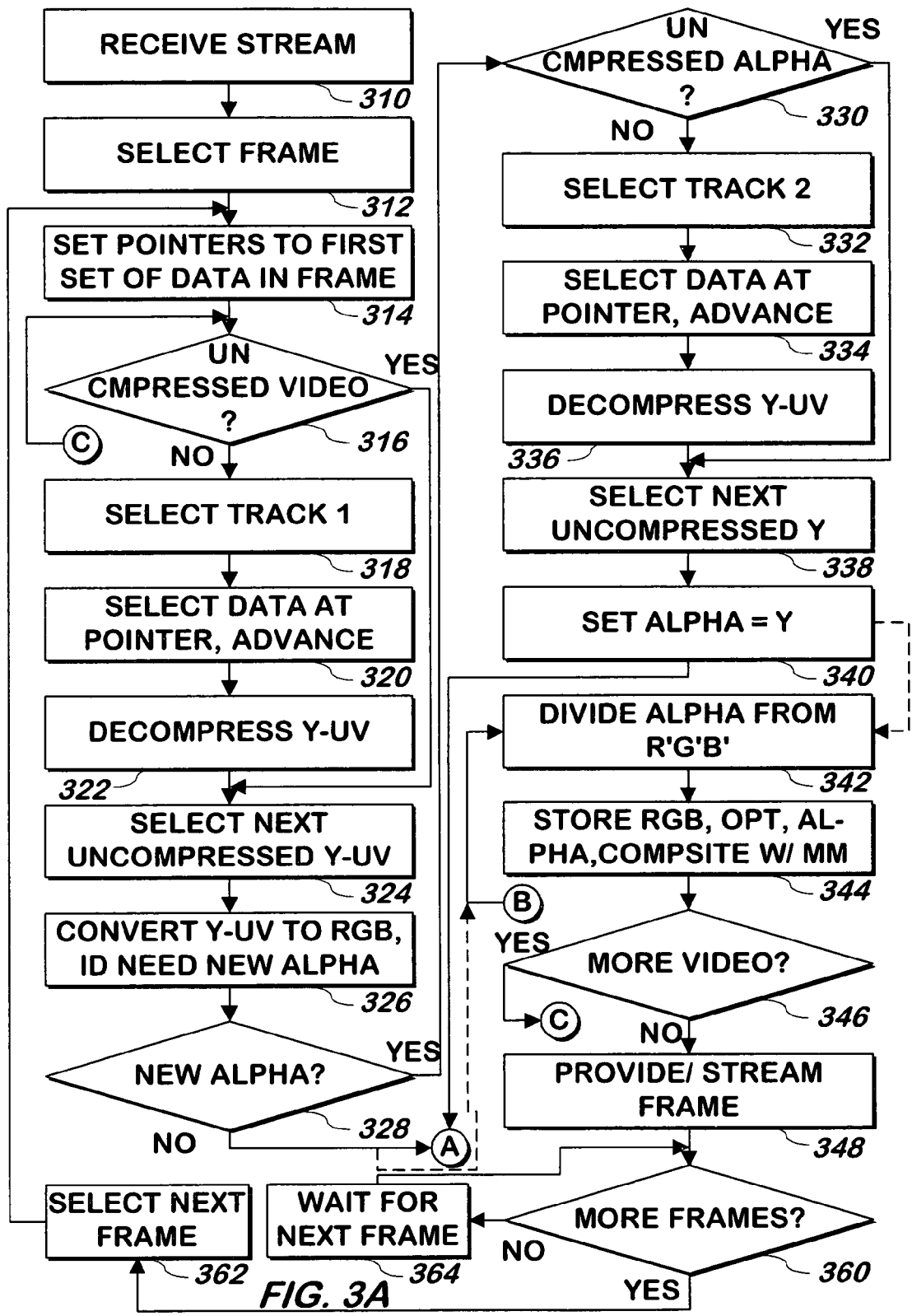

SYSTEM AND METHOD FOR COMPRESSING VIDEO DATA AND ALPHA CHANNEL DATA USING A SINGLE STREAM

RELATED APPLICATION

This application is related to U.S. patent application Ser. No. 11/219,230, entitled "System and Method for Decompressing Video Data and Alpha Channel Data Using a Single Stream", filed by Tinic Uro on Sep. 2, 2005, having the same assignee as the present application and is hereby incorporated by reference in its entirety.

FIELD OF THE INVENTION

The present invention is related to video signal processing and more specifically to video signal encoding and decoding.

BACKGROUND OF THE INVENTION

Video content can be streamed or downloaded over the Internet using a variety of techniques. However, adding alpha channel support for video is much more involved. The alpha channel refers to the transparency of the video: low-value alpha channel video stream composited over another image will make the video image to seem semi-transparent, allowing the user to see the other image, at least in part, through the video.

To support alpha channel in the video can require a video codec that contains alpha channel support. A pair of video codecs are used at either end, one compressing the video stream and the other decompressing the video stream. However, the available video codecs that provide alpha channel support aren't very good at compressing the data. CODECs that do not provide alpha channel support have a much higher compression.

Some products deal with this fact by putting the uncompressed alpha channel into a separate track. Each video frame contains two tracks: one holding the compressed video, encoded as RGB, and the other holding the uncompressed alpha channel information. This arrangement has the advantage that the compression for the video can be exceptionally high, at least in part making up for the fact that the alpha channel track is uncompressed. However, the compression provided is less than what could be possible if the alpha channel was compressed. Because of the lack of the highest compression in CODECs that do provide alpha channel support, a designer is required to choose between two suboptimal solutions.

What is needed is a system and method that can provide alpha channel support for video streaming and downloading, that can provide higher compression than a conventional video codec, and that provides alpha channel support and higher compression than using a conventional codec that does not provide alpha channel support, and therefore leaves the alpha channel data uncompressed.

SUMMARY OF INVENTION

A system and method receives video data in RGB format and alpha channel data and encodes it into a single file or stream. The RGB format video data is premultiplied by the alpha channel. The premultiplied, adjusted RGB data is converted into YUV-encoded video using conventional techniques. The YUV is then compressed using a conventional YUV codec. The alpha channel is added to the Y input of a second YUV codec (or is encoded at a different time using the same codec as is used to encode the video data) and the resulting YUV stream is compressed and stored in a second track of the same file or stream, allowing both tracks to be compressed, but using a video codec that does not provide integrated alpha channel compression, and therefore provides higher compression than would be available using conventional codecs that provide integrated alpha channel support.

The premultiplication is performed to ensure better compression: as the alpha channel is nearer to zero, the compression of the premultiplied signal is greater than the compression of the signal that would occur without the premultiplication. To perform such adjustment, the system and method takes the minimum of the computed premultiplied R and alpha to be the premultiplied R, the minimum of the computed premultiplied G and alpha to be the premultiplied G, and the minimum of the computed premultiplied B and alpha to be the premultiplied B.

At the receiver, each track is decoded using its own YUV decompressor, or the same YUV decompressor at different times, with the Y portion of the second track being extracted as the alpha. The decoded premultiplied YUV is converted to RGB, clamped to not higher than the value of alpha, and divided by the alpha to regenerate at least approximately, the original R, G and B. Although the UV portion of track 2 is not used, the Y portion holds approximately 80% of the data, causing the compression of the Y portion to more than compensate for the waste. Any conventional YUV codec can be used, such as those commercially available from ON2 Technologies. Formats other than YUV may also be used.

DETAILED DESCRIPTION OF A PREFERRED EMBODIMENT

Figure 1:
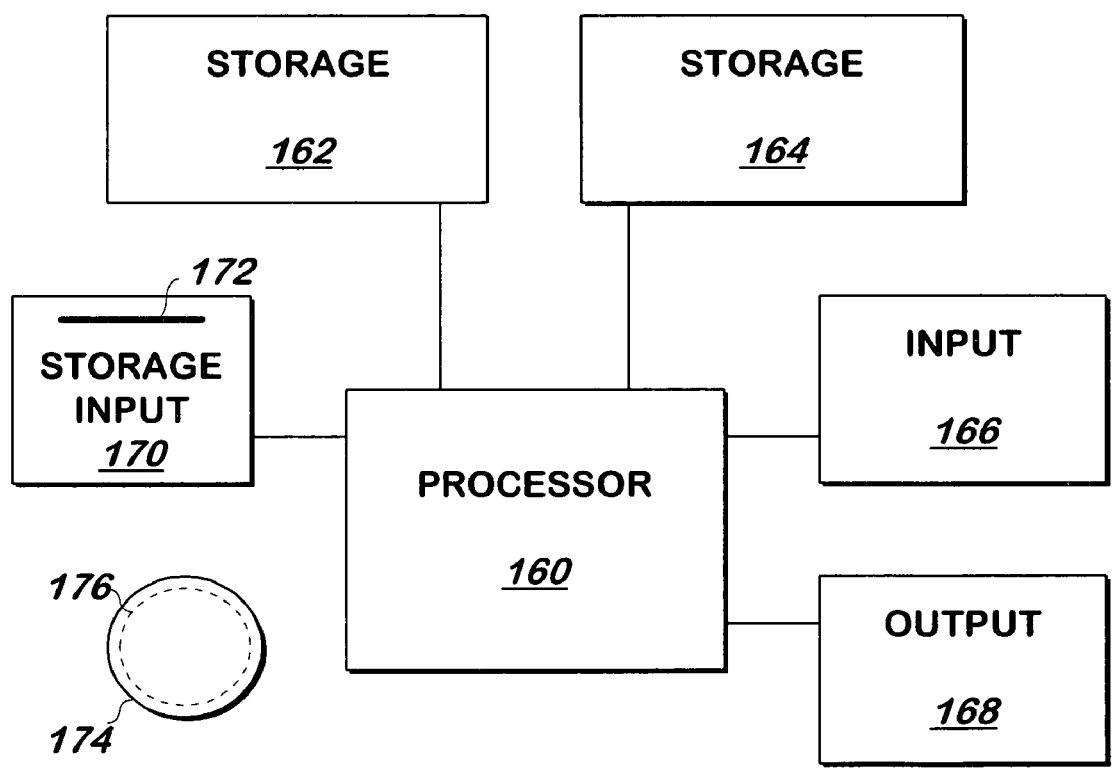
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Texas running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

FIG. 2 is a flowchart illustrating a method of compressing video and its alpha channel data according to one embodiment of the present invention. Referring now to FIG. 2, video data and associated video alpha channel data is received 212. In one embodiment, video data includes conventional RGB formatted video data and the alpha channel data includes either a single alpha channel value for each frame of the video or alpha channel values for components of the video, such as each pixel of the video data. The video data may be received 212 as a single file, or, as indicated by the dashed line in the Figure, as a continuous stream, with additional video data being received while it is being processed as described herein.

The first pixel of video data received in step 212 is selected 214 and the selected pixel of video data is premultiplied 216 by its corresponding alpha channel data value. In one embodiment, this is accomplished by individually multiplying the R value, G value and B value of a pixel by the alpha value corresponding to that pixel. The premultiplied R, G and B values are referred to herein as R', G', and B'.

Alpha channel data values are used generally to composite the video data with other multimedia data. The alpha channel data values for the video are a measure of the opacity of the video. Alpha channel values of zero cause the video data to be invisible with respect to other multimedia being displayed behind the video corresponding to the video data (e.g. an animation such as a conventional Flash animation to be displayed by the conventional Flash player plug-in to conventional browsers commercially available from Macromedia, Inc., of San Francisco, Calif.), and alpha channel values of one cause the video data to appear to be opaque with respect to other multimedia being displayed behind the video corresponding to that video data.

In one embodiment, each pixel is received with its own alpha channel value. In another embodiment, a pixel may not be received with an alpha channel value, in which case the pixel is considered to have the alpha channel value of the prior pixel until a pixel having a designated value is received. Alternatively, the number of pixels to which an alpha channel value corresponds may be stored adjacent to that alpha channel value. In such embodiment, the alpha channel value of the prior pixel may be retained and used as the alpha channel value for the pixel being currently processed until a new alpha channel value is to be used for the pixel.

The RGB values of the video are converted 230 to YUV values, either using a conversion table or via calculations. Any conventional conversion may be used, such as those described in ITU-R BT.601, which is described at en.Wikipedia.org/wiki/YUV, and en.Wikipedia.org/wiki/CCIR_601 In one embodiment, the conversion is made as follows:

$$Y=0.299R+0.587G+0.114B \qquad (\text{Eq. 1})$$

$$U=0.492(B-Y)=-0.147R-0.289G+0.436B \qquad (\text{Eq. 2})$$

$$V=0.877(R-Y)=0.615R-0.515G-0.100B \qquad (\text{Eq. 3})$$

The YUV data converted in step 230 is added 232 to a compression buffer, and if there is a new alpha value for the set of pixels or an alpha value for the pixel 234, the alpha value is added to the compression buffer as the Y-portion of YUV-formatted data and the method continues at step 238. In one embodiment, if the alpha channel values are shared among various pixels, if the alpha channel value of a prior pixel is used, it may not be added to the compression buffer in one embodiment, such value being added only when it is initially received.

Other information may be stored in the compression buffer, and treated as part of the video data or alpha channel data. For example, if the alpha channel value indicates a number of pixels corresponding to the alpha channel value, such information is stored with the alpha channel value and will be compressed along with it as described below.

At step 238, if there are no more pixels received in step 212, an indication is made that the conversion is done 238 and otherwise 238, the next pixel is selected 242 and the method continues at step 216 using the selected pixel.

Compression and Building of the Frame.

The compression of the video data in the compression buffer is shown in the flowchart of FIG. 2B according to one embodiment of the present invention.

Referring now to FIG. 2B, data to be compressed is received 250 into a buffer. The data may be video data or alpha channel data. If a frame exists, the method continues at step 256 and otherwise, a new frame is built 254. In some embodiments, there may be leftover compressed data that was not able to be added to the prior frame. In those embodiments, step 254 includes adding such compressed data to the frame, either the video track or the alpha channel track, depending on whether the leftover compressed data corresponds to video or alpha channel data, respectively.

If at least some of the data received in the buffer being processed plus any remaining uncompressed data in the buffer defines a set of data that is ready for compression 256, the method continues at step 258 and otherwise 256, the method continues at step 250, maintaining the data received plus any data not already compressed in the buffer for the next iteration of step 256. In one embodiment, a set of data is ready for compression if the data received is incompatible with an optimum compression of the uncompressed data previously stored in the buffer. As a simple example, in the series of data 4, 4, 4, 4, 4, 8, 8, 8, that would be compressed as 5, 4 and 3, 8 to indicate 5 "4"s and 3 "8"s, as each of the '4's arrives, they are not ready for compression because it is unknown how many '4's there will be to allow the optimum compression to occur. However, when the first of the '8's arrives, the five '4's are then compressible, and the arriving 8 will remain in the buffer.

In one embodiment, data is also ready for compression when no further data will be received for the track, frame or both (e.g. the data received is the last piece of data, which may be indicated using a special value, with any actual data having that value converted to a slightly different value) or when no further data can be added to the track, for example, because it is full or because a logical end has been reached.

It isn't necessary to store the video data and alpha channel data in the compression buffer, as the compression may be performed by receiving data for one pixel at a time and one alpha channel value at a time and saving different state variables for each and causing the compressed data to be written out at such time as data is received that will allow compressed data to be written out without any loss of compression. For example, in the simple compression scheme in which a value is followed by the number of times that value was consecutively received in the compressed state, the compressed data would be provided when a value is received that is different from the data received immediately prior. Until then, state indicating the value of the previously received data, and the number of times it was consecutively received, may be stored. Thus, the use of a compression buffer is but one way of implementing the present invention.

At step 258, the data received as YUV data in the buffer is output as compressed YUV data using any conventional compression algorithm, such as those specified by the H.263 or H.261 standards, or any conventional compression algorithm based upon either or both of them or derived from either or both of them, or using the conventional On2 Technologies VP6 codec compression product commercially available from On2 Technologies, of New York, N.Y., with any uncompressed data remaining in the buffer. As noted above, two types of data are received in the buffer and the data type received is processed only with other data of that type. Thus, video data is only processed with other video data, or state variables, (for that type of data), but not with any alpha channel data, and vice versa. If the track is done, either because it is full or a logical end of the track is indicated 260, the method continues at step 264 and otherwise 260, the compressed data is added 262 to the video or alpha channel track, depending on the buffer being processed, and the method continues at step 250. Otherwise 260, any leftover compressed data is stored 264 to be added to the next frame.

If the frame is ready to be output 266, the frame is output 268, for example, by storing it to a file or by streaming it to one or more computer systems and the method continues at step 250. Otherwise 266, the method continues at step 250.

Figure 2A:
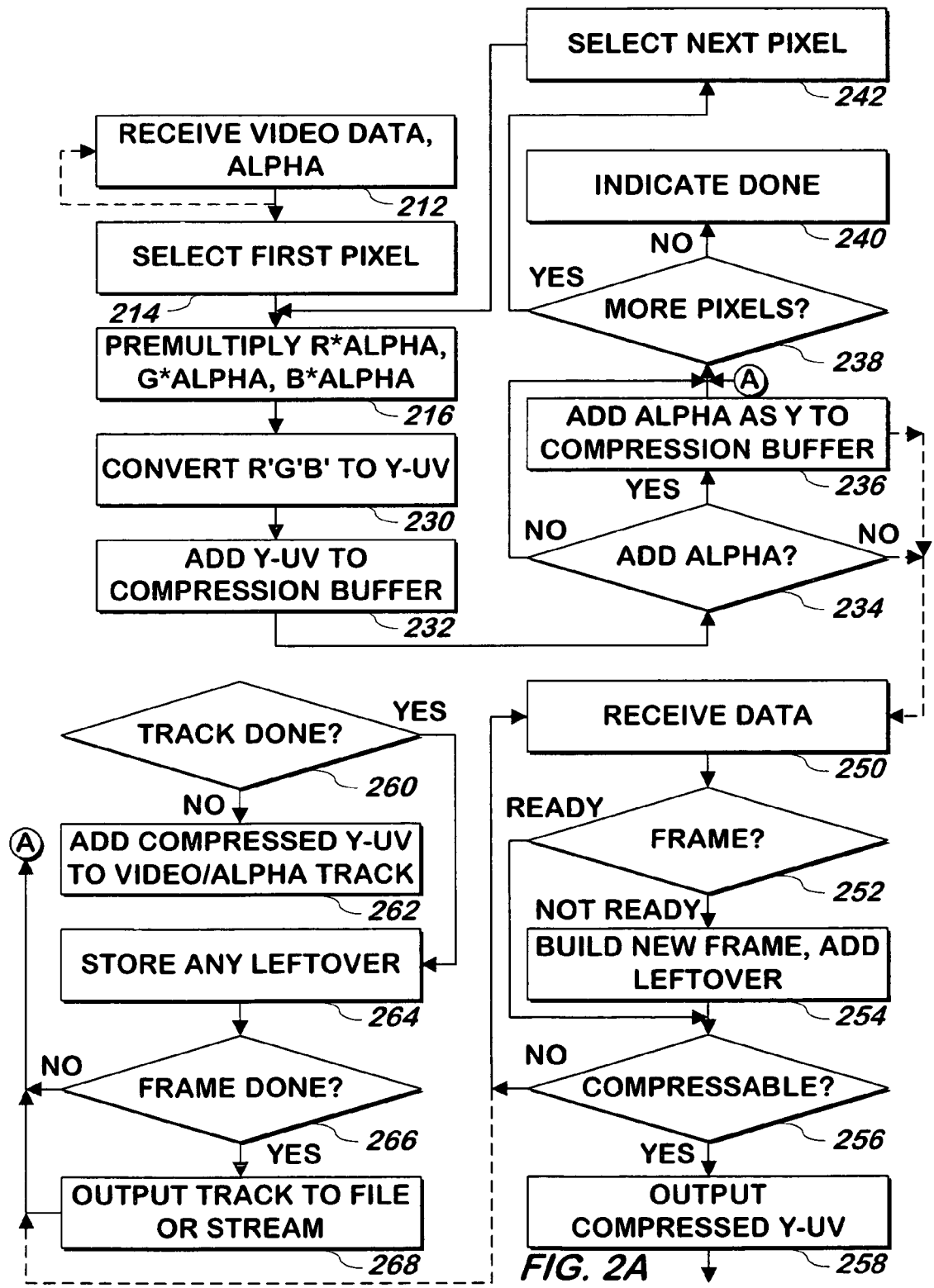
FIG. 2A is a flowchart illustrating a method of compressing video data and its associated alpha channel data according to one embodiment of the present invention.

In one embodiment, instead of continuing at step 250 each time, in which case the flow charts of FIGS. 2A and 2B can operate as independent processes, the method can process one pixel of video data and one element of alpha channel data if any, and then the method continues at step 238. In such embodiment, in FIG. 2A, step 250 follows step 236 or the "no" branch of step 234, so that each pixel of video data (and any additional alpha channel data) is processed fully through FIGS. 2A and 2B before the next pixel is processed.

Figure 3B:
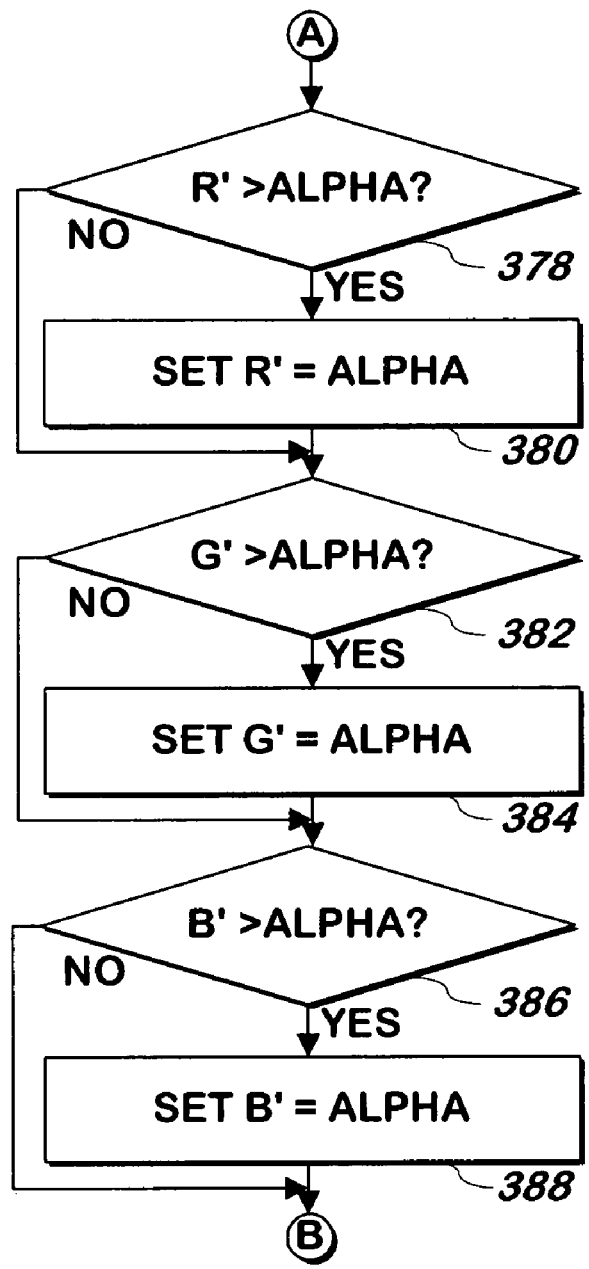
FIG. 3, consisting of FIGS. 3A and 3B, is a flowchart illustrating a method of decompressing video and its alpha channel data according to one embodiment of the present invention.
Figure 3:
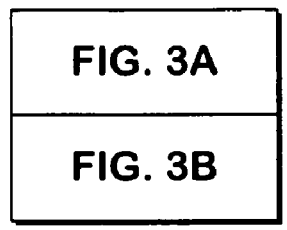

FIG. 3, consisting of FIGS. 3A and 3B, is a flowchart illustrating a method of decompressing video and its associated alpha channel information according to one embodiment of the present invention. The video and alpha channel data decompressed using the steps of FIG. 3 may be compressed in the manner described in FIG. 2 above. Referring now to FIG. 3, specifically, FIG. 3A, a stream or file of frames of video and alpha channel information is received 310. A frame is selected 312 and two pointers serving as placeholders into the data corresponding to the first pixel of track one and track two of the selected frame are initialized 314.

As described above, in one embodiment, each pixel may have its own alpha channel value and in other embodiments, some alpha channel values may be shared across multiple pixels. Information may be included with each alpha channel value or with certain pixels that designates whether a new alpha channel value is required or whether the previous one should be reused, or such information may be implied. For example, each layer may employ its own alpha channel value and a new one is used when the first pixel from a new layer is selected for display. The boundary for a new layer may be a reserved value of pixel, for example with pixels that actually have that value being adjusted slightly.

As such, some embodiments may obtain a pixel, and then determine whether to obtain a new alpha channel value, however other embodiments in which a new alpha channel value is always obtained with every pixel, or embodiments in which the determination as to whether a new alpha channel value is to be obtained may be made without obtaining the next alpha channel value can obtain any new alpha channel value, before the next pixel is obtained. As will now be described, the pixel is obtained first, and then the alpha channel value is obtained. This example illustrates the desirability of identifying the proper alpha channel value as the pixel is being processed. If the alpha channel value is first obtained, processing may be easier because the alpha channel value used to properly decode the pixel value will already be available.

In one embodiment, at any given time, there may be pixels that are compressed, some that are decompressed but not further processed (because the decopmpression may decompress a batch of pixels, only one of which is then processed). If there is an uncompressed pixel that has not been otherwise processed as described herein 316, that pixel will be represented as an uncompressed YUV-formatted pixel, and such pixel is selected 324 and converted 326 to RGB using any conventional conversion method, such as that specified by ITU-R BT.601, that described at www.fourcc.org/fccyvrgb-.php or equations 4 through 6 below, and the method continues at step 330.

$$R = Y + 1.402(U-128) \quad \text{(Eq. 4)}$$

$$G - Y - 0.34414(V-128) - 0.71414(U-128) \quad \text{(Eq. 5)}$$

$$B = Y + 1.772(V-128) \quad \text{(Eq. 6)}$$

If there is no uncompressed video pixel 316, track 1 is selected 318 and the compressed data for one or more pixels at the pointer for track 1 is selected, and the pointer is advanced to the data representing the next set of one or more pixels in track 1 320. The smallest amount of decompressible compressed data at the pointer is decompressed 322 to produce one or more uncompressed pixels and the method continues at step 324 as described above. The decompression used may be any conventional decompression algorithm corresponding to the compression algorithm used above, such decompression algorithms including those specified by the H.263 or H.261 standards, or any conventional algorithm based upon either or both of them or derived from either or both of them, or may be performed by the conventional On2 Technologies VP6 codec decompression product commercially available from On2 Technologies of New York, N.Y.

Step 326 may include identifying whether a new alpha value is required in embodiments that employ such determination and do not supply an alpha channel value with each video pixel. In one embodiment, a pixel value may be reserved for the purpose of indicating that the next alpha channel value should be obtained for use with all subsequent pixels until the next time the reserved value is used as a pixel. The reserved value is then discarded and another pixel is obtained. Pixels that have the reserved value when received for encoding are converted to a nearby value. Alternatively, each alpha channel value may indicate to how many pixels it applies.

If an alpha channel value from those unprocessed is to be used with the pixel being processed 328, if an uncompressed alpha channel value is available, 330, the next uncompressed Y value from track 2 is selected 338 and the alpha is set to that value 340 and the method continues at step 342.

If an unprocessed alpha channel value is not needed 328, because for example, a previous alpha channel value can be used, the method continues at step 378 of FIG. 3B, described below, using the prior alpha channel value.

If a new alpha channel value is needed 328 but there are no uncompressed alpha channel values available 330, the second track is selected 332 and the alpha channel data pointed to by the pointer at the selected track is selected 334, the smallest decompressible set of one or more of the YUV data is decompressed 336, using any conventional decompression algorithm compatible with the compression, such as those specified by the H.263 or H.261 standards, or any conventional algorithm based upon either or both of them or derived from either or both of them, or using the conventional On2 Technologies VP6 codec decompression product commercially available from On2 Technologies, New York, N.Y., and the alpha for the pixel being processed is set 340 equal to the decompressed Y from the first YUV decompressed and the method continues at step 378 of FIG. 3B.

In one embodiment, illustrated in FIG. 3B, a check is made to ensure that the premultiplied R', G' or B' of the pixel does not exceed the value of the alpha corresponding to that pixel, and if any of them do 378, 382, 386, the value of the premultiplied R', G' or B' that exceeds the value of the corresponding alpha is reduced to the corresponding alpha. The method continues at step 342. If the check is not performed, step 342 follows step 340 as shown by the dashed line in the Figure or step 342 follows the "no" branch of step 328, also shown by the dashed line in the Figure. The check "clamps" the premultiplied values of R', G', or B' to not higher than alpha, to correct for any losses in the compression that could cause any of them to have a value higher than alpha. Reducing them to a value of alpha will cause them to be at least closer to their original values, after the division of step 342, below.

The uncompressed video data is the RGB data premultiplied by alpha as described above, and so it is referred to herein as R'G'B'. Each of the R'G'B' values are divided 342 by the corresponding alpha to produce unpremultiplied values that are at least approximately equal to their original counterparts received in step 212.

The alpha and video data may be formatted as described below and stored 344 or provided and such storage or provision is made for the purpose of compositing the video data with multimedia data using the alpha channel data as a measure of opacity of the video data with the multimedia or other information intended to be displayed beneath it. In one embodiment, storage of the alpha channel data and video data is made by formatting it into the conventional RGBA or ARGB file format, in which each component, the alpha and each of the R, G and B consist of eight bits to form a 32 bit pixel, with the alpha value either at the head or tail of each pixel. RGBA is described at en.wikipedia.org/wiki/RGBA and e.wikipedia.org/wiki/RGB, with ARGB being a variant of RGBA.

If there is more unprocessed video in the frame 346, either uncompressed video pixels that have not been processed, or compressed video pixels, the method continues at step 316 and otherwise 346, the video may be provided 348 via the file or by streaming it. If more frames are available 360, the next frame is selected 362 and the method continues at step 314 using the newly-selected frame. Otherwise 360, the next frame is awaited 364 and the method continues at step 360. It isn't necessary to provide the video when the frame has been completely processed, and so in one embodiment, each pixel or a group of pixels, when sufficient numbers of pixels have been processed as described herein; may be provided as part of step 344.

Figure 4:
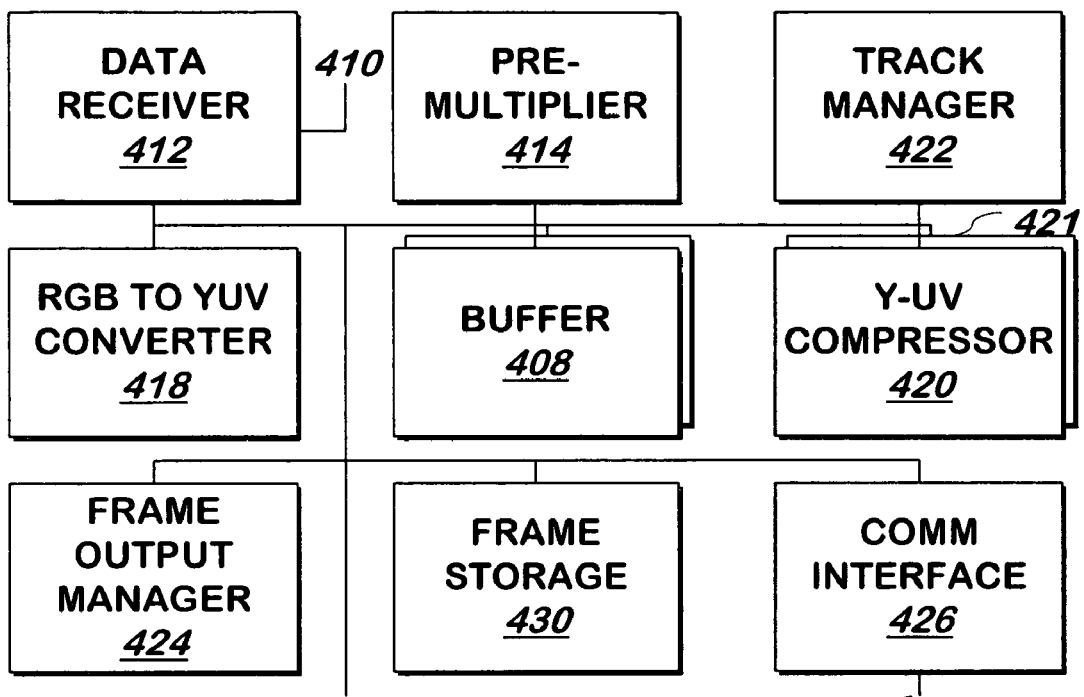
FIG. 4 is a block schematic diagram of a system for compressing video and its associated alpha channel data according to one embodiment of the present invention.

Referring now to FIG. 4, a system for compressing, and placing into a stream, video data and associated alpha channel data is shown according to one embodiment of the present invention. Data receiver 412 receives via input/output 410 video data in pixels, in RGB format, and alpha channel data. An indication as to whether the data is alpha channel data or video data may either be expressly made as part of the data or may be implied from the ordering of the information or by using other conventional formatting techniques. In one embodiment, such data is received in the conventional ARGB or RGBA format, though other conventional file formats, or those for storing video data, may be used.

Input/output 410 may be connected to a conventional video capture device or a file that contains video data in RGB format and alpha channel data for the video data. In one embodiment, data receiver 412 includes suitable communications interface hardware and software allowing it to receive the data in a suitable format.

As noted above, the alpha channel data may be received for each pixel or a single alpha channel value may be received that should be applied to multiple pixels. If the data is alpha channel data, data receiver 412 retains it and also adds it as the Y data of YUV data and provides the YUV formatted alpha channel data to the end of an alpha channel queue or location in buffer 408. Buffer 408 includes conventional memory or disk storage, which may be arranged as two conventional queues: an alpha channel queue and a video queue, although two locations, or other arrangements may be used. Although buffer 408 is described as a separate element, the buffer 408 may in fact be part of YUV compressor 420 described below. In one embodiment, there are two buffers: one for the video data and another for the alpha channel data, each one arranged as a conventional queue or two locations.

If the data is a pixel of video data, data receiver 412 provides the first pixel of the video data and also provides the then currently applicable alpha channel data (e.g. the most recently received alpha channel data) to premultiplier 414. In embodiments in which the alpha channel data follows the video data, data receiver 412 may buffer the video data until it receives the alpha channel data that corresponds to the video data, at such time providing the video data and alpha channel data as described above.

Processing of Video Data

When it receives the video data, premultiplier 414 premultiplies each of the R, G and B by the alpha channel data it receives to produce R', G' and B' and provides the resulting R', G' and B' and the alpha channel data to RGB to YUV converter 418.

When it receives the R'G'B', RGB to YUV converter 418 converts the R', G' and B' to YUV format as described above. In one embodiment, RGB to YUV converter 418 performs the conversions from RGB to YUV described herein. RGB to YUV converter 418 then provides the YUV data to the end of the video queue in buffer 408.

Compression of Video and Alpha Channel Data

In one embodiment, YUV compressor 420 monitors the two queues or locations in buffer 408 and compresses the YUV video data and alpha channel data received as described above to allow for optimum compression.

In one embodiment, two YUV compressors 420, 421 are used: one for video data and one for alpha channel data. Each one 420, 421 obtains from the appropriate queue or location in buffer 408 either the video data or alpha channel data in YUV format. When YUV data is received, the appropriate YUV compressor 420 or 421 identifies whether compressed output may be made, and if so, outputs the compressed data to track manager 422, removes the uncompressed data corresponding to the output compressed data from the buffer, and either retains the uncompressed data or internally updates a state of the uncompressed data received and optionally removes it from buffer 408. If compressed data is not ready for output as described above, YUV compressor 420, 421 either retains the uncompressed data in the buffer 408, or discards it and internally updates the state of the uncompressed data received. In one embodiment, YUV compressor 420 performs any conventional compression algorithm, such as those specified by the H.263 or H.261 standards, or any conventional compression algorithm based upon either or both of them or derived from either or both of them, or includes the conventional On2 Technologies VP6 codec compression product commercially available from On2 Technologies, New York, N.Y. As noted, YUV compressor 420 compresses the alpha channel data as if it was the Y channel of YUV video data.

Storage of the Data

YUV compressor 420 provides the compressed YUV video data or the compressed alpha channel data (and an indication as to whether the data is video data or alpha channel data) to track manager 422, which stores the compressed YUV video into the first track of the current frame in frame storage 430 or stores the compressed YUV alpha channel data into the second track of the current frame in frame storage 430 based on the indication it receives. In one embodiment, pointers to the current frame, track one of that frame, and track two of that frame are stored in frame storage 430 at a known location by track manager 422 when it builds the frame. Track manager 422 uses the pointer for track 1 to store in frame storage 430 the compressed YUV video and the pointer for track 2 to store the compressed YUV alpha channel data, and then track manager 422 updates the pointers to the track corresponding to the data it stores.

In one embodiment, when the either track of a frame is full, track manager 422 builds a new frame and supplies the remainder of the video data and/or alpha channel data to the appropriate track in the frame that has capacity to accept it. As it stores data into the frame, track manager 422 updates the appropriate pointers for each track to allow it to identify an unused location in each track in which to store additional compressed data.

When a frame is full, track manager 422 completes the frame and adds the pointer to the current frame to the end of a stream/storage queue in frame storage 430, removes a pointer from a queue of pointers to available frames (that it initializes upon startup) in frame storage 430, builds another frame into frame storage 430 if one was not already built as described above, and sets the pointers to the new frame, and tracks as required.

Frame output manager 424 monitors the stream/storage queue in frame storage 430 and when it identifies a pointer at the head of the queue, it either stores, via communication manager 426 the frame into a file, which may be later streamed via a network, or outputs it as a stream via input/output 428 to a network via communication manager 426. Communication manager 426 includes a conventional communication interface that may include support for TCP/IP, Ethernet, and other conventional communication protocols. The network may include a local area network, the Internet, or both.

Figure 5:
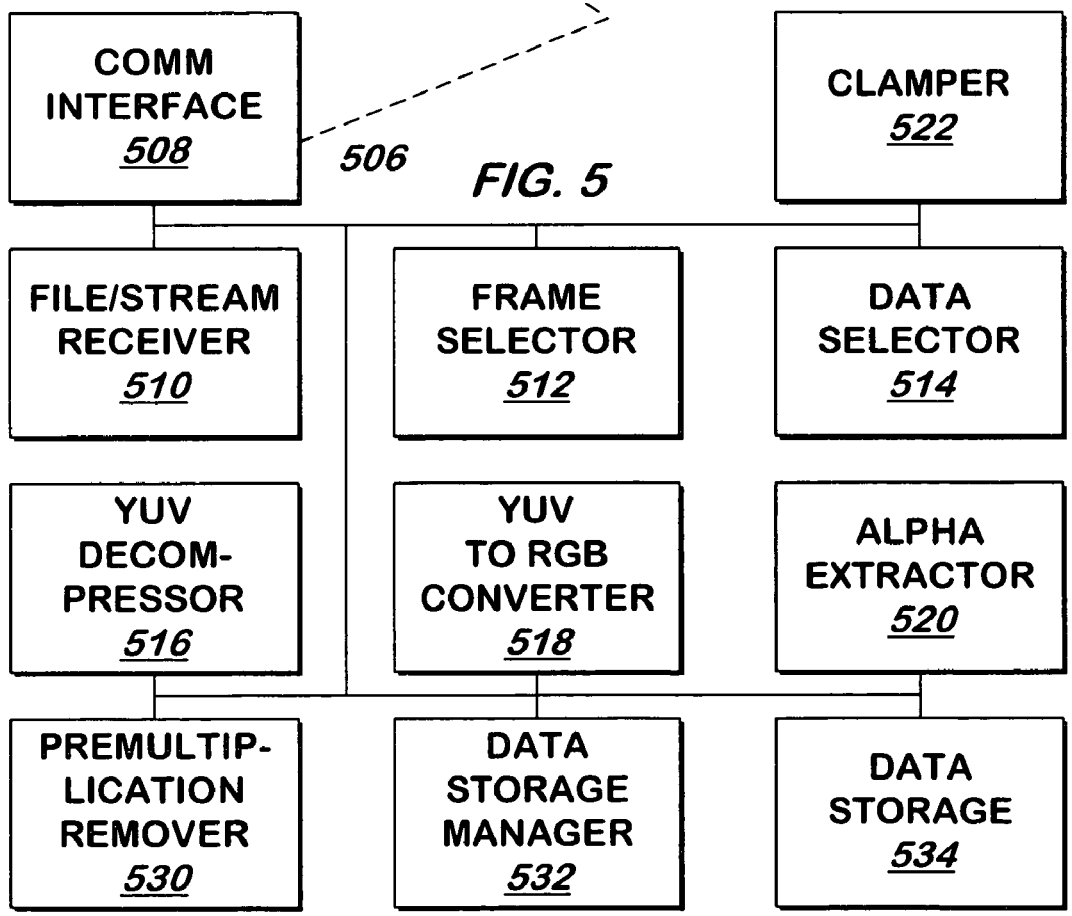
FIG. 5 is a block schematic diagram of a system for decompressing video and its associated alpha channel data according to one embodiment of the present invention.

FIG. 5 is a block schematic diagram of a system for decompressing and providing video data and alpha channel data according to one embodiment of the present invention. The system of FIG. 5 may be used to decompress compressed alpha channel and video data compressed as described herein. Referring now to FIG. 5, the file or stream may be received via input/output 506 of communication interface 508, which includes a conventional communication interface that may include support for TCP/IP, Ethernet, and other conventional communication protocols. When communication interface 508 receives the file or stream, it provides it to file/stream receiver 510.

When it receives a file or begins to receive a stream, file/stream receiver 510 provides the file, or a frame or frames received from the stream or file to data storage 534 with the frames arranged sequentially. Frame selector 512 monitors data storage (which may be arranged, by file/stream receiver 510 in the portion of data storage 534 reserved for the stream, as a set of frames received and pointer to one or more frames) and selects the first frame from the stream.

Frame selector 512 initializes a set of pointers to the tracks in the frame, one corresponding to track one and one corresponding to track two of the selected frame if track two exists (or null otherwise), places them in known locations in data storage 534 for the current frame and signals YUV to RGB converter 518.

In one embodiment, track one starts every frame or is located at a fixed offset from the start of the frame and either contains a fixed number of bytes or an end-of-track marker. Frame selector 512 uses the location of track one to initialize the pointer to it and uses the length of track one or the end-of-track marker to set the pointer to the start of track two.

When signaled, YUV to RGB converter 518 identifies whether it has at least one pixel of uncompressed, but otherwise unprocessed video data. If so, YUV to RGB converter 518 converts the next pixel of YUV-format data to RGB-format data, though the values are R'G'B' values, premultiplied by alpha as described above. YUV to RGB converter 518 provides the RGB-format data to damper 522, described below and discards the YUV-format video data corresponding to the RGB-format data it provides.

If YUV to RGB converter 518 does not have at least one pixel of uncompressed, but otherwise unprocessed video data, YUV to RGB converter 518 signals YUV decompresor 516 with an identifier of track number one to indicate that it requires additional video data.

When so signaled by YUV to RGB converter 518 YUV decompressor 516 retrieves the smallest set of data at the track one pointer that can be decompressed into to one or more pixels, decompresses it, and updates the pointer to the next set of data in the track, or provides to frame selector 512 an indicator that indicates that there is no more data in track one of the current frame and frame selector selects the next frame and updates the pointer to track one of that frame. YUV decompressor 516 then provides the uncompressed YUV video data to YUV to RGB converter 518, for use as described above.

In one embodiment YUV decompressor 516 performs any conventional decompression algorithm compatible with the compression, such as those specified by the H.263 or H.261 standards, or any conventional algorithm based upon either or both of them or derived from either or both of them, or includes the conventional On2 Technologies VP6 codec decompression product commercially available from On2 Technologies, New York, N.Y. and YUV to RGB converter 518 performs the conversion from YUV to RGB as described above.

Clamper 522 adjusts, if necessary, the R', B' and/or G' to ensure that none of them exceeds the alpha channel data value as described above. Clamper 522 provides the resulting R', G' and B', adjusted as required, to RGB to premultiplication remover 530.

When it receives the R'G'B' video data as described above, in one embodiment, premultiplication remover 530 determines whether a new alpha channel value corresponds to the first unprocessed pixel of the video data it received, or the same alpha channel value it used previously may be used. In one embodiment, a predetermined R'G'B' value is used to indicate that a new alpha channel value is used, the R'G'B' value being inserted when the predetermined RGB value is received, with any actual R'G'B' that equals the predetermined value being adjusted to a nearby value. If the previous alpha channel value is to be used, premultiplication remover 530 uses the premultiplied video data it receives and the prior alpha channel information as described above and divides each of the premultiplied R', G', and B' by the corresponding alpha channel data for that pixel, to produce an R, G and B that at least approximately corresponds to the R, G and B that had been received at data receiver 412 of FIG. 4. In one embodiment, premultiplication remover 530 stores the alpha for the next set of video data it receives, for reuse. Premultiplication remover 530 signals YUV to RGB converter 518 and provides the resulting pixel to data storage manager 532.

If a different alpha channel value is required, premultiplication remover 530 determines whether it has received the alpha channel value from YUV decompressor 516. If so, it selects the next alpha channel value in the order in which it was received and provides it to alpha extractor 520. If not, it signals YUV decompressor 516 with an identifier of track two, to indicate that the next set of one or more decompressed alpha channel value at the track two pointer is required. YUV decompressor 516 selects the next set of data that will decompress into the minimum number of YUV data at the track two pointer, decompresses the data, provides the decompressed data to premultiplication remover 530, and updates the track two pointer. Premultiplication remover 530 then stores the YUV data, selects the first YUV-formatted pixel and provides it to alpha extractor 520.

Alpha extractor 520 receives the uncompressed YUV containing the alpha channel data, and extracts the Y channel from the YUV formatted information it receives as the alpha channel data. Alpha extractor 520 then provides the alpha channel data to premultiplication remover 530 for use as described above and to data storage manager 532 for use as described below. When premultiplication remover 530 receives the alpha channel data, it processes it as described above, signals YUV to RGB converter 518, and provides the resulting pixel to data storage manager 532 when signaled, YUV to RBG converter 518 repeats the process.

Although the use of a single YUV decompressor is described herein to decompress both the video data and the alpha channel data, in another embodiment, two or more decompressors are used that can simultaneously decompress the YUV data from the two tracks. However, in one embodiment, all decompressors used to decompress video data and alpha channel data employ the same decompression algorithm and the video and alpha channel data are, for a time, in the same format.

Data storage manager 532 receives the video data and alpha channel data for each of the pixels and formats them into a data structure or a file in data storage 534. In one embodiment, data storage manager 532 formats the video data and alpha channel data into the conventional RGBA or ARGB file format described above. The file can then be used by a conventional multimedia program such as the Flash Player plug-in to conventional browsers, to integrate the video with other multimedia, such as conventional Flash animations. The alpha channel is used to composite the video data with one or more layers of multimedia images underneath the video data as described above.

What is claimed is:

1. A method of providing video data and alpha channel data, comprising:
   receiving the video data and;
   the alpha channel data;
   premultiplying the video data by the alpha channel data
   converting the multiplied video data and the alpha channel data to a new data format;
   separately compressing the multiplied and converted video data and the converted alpha channel data using a single compression algorithm; and
   providing the compressed video data and compressed alpha channel data.

2. The method of claim 1 wherein the new data format comprises YUV.

3. The method of claim 2, wherein the converted alpha channel data is placed in the Y portion of the YUV format.

4. The method of claim 3, wherein the received video data comprises pixels, comprising RGB data.

5. A system for providing video data and alpha channel data, comprising:
   storage; and
   a processor coupled with the storage and configured to effect:
      a data receiver having a first input coupled for receiving the video data and a second input coupled for receiving the alpha channel data, the data receiver for providing the video data and alpha channel data at an output,
      a premultiplier coupled between the data receiver and a converter, the premultiplier for premultiplying the video data by the alpha channel data;
      the converter coupled between the premultiplier and at least one compressor, the converter for converting the multiplied video and the alpha channel data to a new data format; and
      the at least one compressor having an input coupled to an output of the converter for receiving the multiplied and converted video data and the converted alpha channel data, the at least one compressor for separately compressing the multiplied and converted video data and the converted alpha channel data using a single compression algorithm, the at least one compressor for providing, via an output, the compressed video data and compressed alpha channel data.

6. The system of claim 5 wherein the new data format comprises YUV.

7. The system of claim 6, wherein the converted alpha channel data is placed in the Y portion of the YUV format.

8. A system for providing video data and alpha channel data, comprising:
   storage; and a processor coupled with the storage and configured to effect:

a data receiver having a first input coupled for receiving the video data in a first format and a second input coupled for receiving the alpha channel data in the first format, the data receiver for providing the video data and alpha channel data at an output, wherein the received video data comprises pixels, comprising RGB data, at least one compressor having an input coupled to the data receiver output for receiving the video data and alpha channel data, the at least one compressor for separately compressing the video data and alpha channel data using a single compression algorithm for each of the video data and the alpha channel data, the compressor for providing, via an output, the compressed video data and compressed alpha channel data in one selected from a single stream and a single file;

a premultiplier coupled between the data receiver output, via a premultiplier input, and the compressor input, via a premultiplier output, the premultiplier for multiplying each of the R, G and B of the pixels of the video data by the alpha channel data corresponding to each said pixel; and a converter coupled between the premultiplier output, via a converter input, and the compressor input, via a converter output, the converter for converting the multiplied R, G and B into the first format for each said pixel.

9. The system of claim 8 additionally comprising an adjustor coupled between the premultiplier output, via an adjustor input, and the compressor input, via an adjustor output, the adjustor for adjusting at least one of the multiplied R, G or B of at least one pixel responsive to:

the alpha channel data corresponding to the pixel; and
said multiplied R, G or B.

10. A computer program product comprising a computer useable medium having computer readable program code embodied therein for providing video data and alpha channel data, the computer program product comprising computer readable program code devices configured to cause a computer system to:

receive the video data and;
the alpha channel data;
premultiply the video data by the alpha channel data
convert the multiplied video data and the alpha channel data to a new data format;
separately compress the multiplied and converted video data and the converted alpha channel data using a single compression algorithm; and
provide the compressed video data and compressed alpha channel data.

11. The computer program product of claim 10 wherein the new data format comprises YUV.

12. The computer program product of claim 11, wherein the converted alpha channel data is placed in the Y portion of the YUV format.

13. The computer program product of claim 12, wherein the received video data received comprises pixels, comprising RGB data.

14. The computer program product of claim 13 additionally comprising the computer program product comprising computer readable program code devices configured to cause the computer system to adjust at least one of the multiplied R, G or B of at least one pixel responsive to:

the alpha channel data corresponding to the pixel; and
said multiplied R, G or B.

* * * * *

UNITED STATES PATENT AND TRADEMARK OFFICE
CERTIFICATE OF CORRECTION

PATENT NO. : 8,189,908 B2  Page 1 of 1
APPLICATION NO. : 11/219232
DATED : May 29, 2012
INVENTOR(S) : Tinic Uro It is certified that error appears in the above-identified patent and that said Letters Patent is hereby corrected as shown below:

Column 12, line 21 (line 5 of claim 1) of the printed patent, delete "data" and insert -- data; --.

Column 14, line 11 (line 9 of claim 10) of the printed patent, delete "data" and insert -- data; --.

Column 14, line 25 (line 2 of claim 13) of the printed patent, delete "data received" and insert -- data --.

Signed and Sealed this
Fourteenth Day of August, 2012

David J. Kappos
*Director of the United States Patent and Trademark Office*